March 22, 1932. J. W. ROBERTS 1,850,691
AUTOMOBILE SLEIGH
Filed April 24, 1930 2 Sheets-Sheet 2
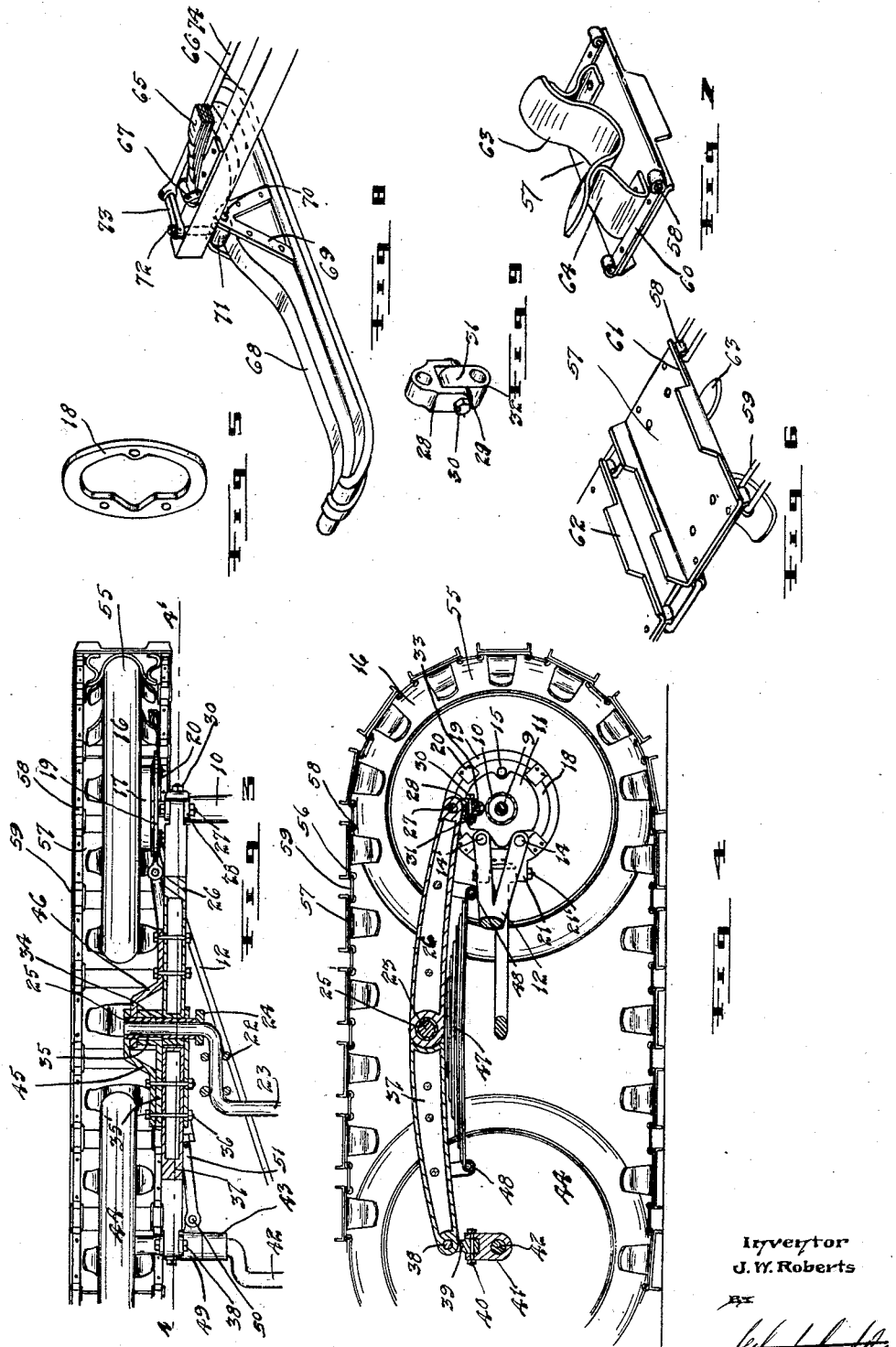
Inventor
J. W. Roberts Patented Mar. 22, 1932

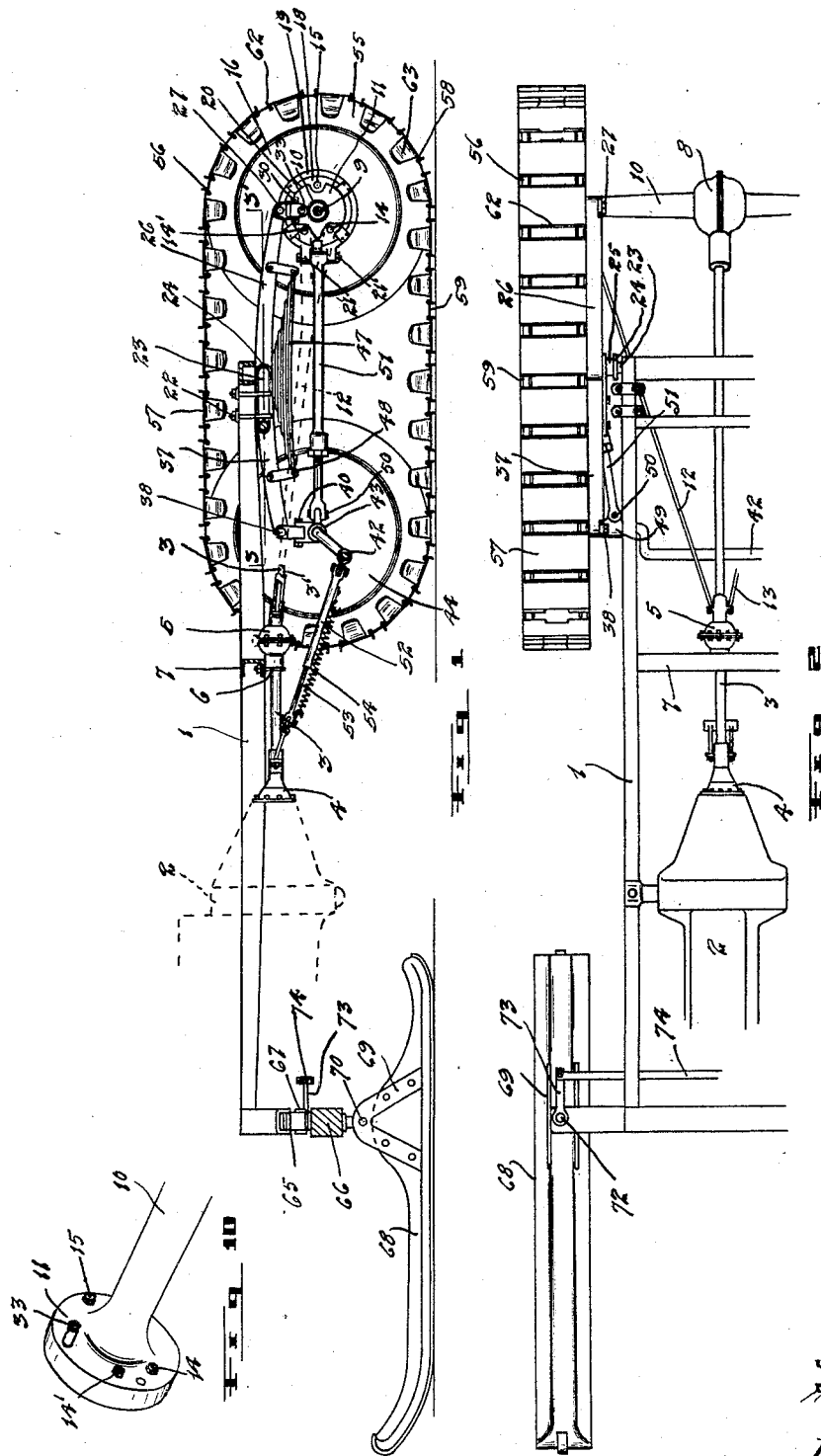

1,850,691

UNITED STATES PATENT OFFICE

JOSEPH W. ROBERTS, OF PORTAGE LA PRAIRIE, MANITOBA, CANADA

AUTOMOBILE SLEIGH

Application filed April 24, 1930. Serial No. 447,058.

The invention relates to improvements in automobile sleighs and an object of the invention is to provide a device particularly adapted for operating on snow or ice and which is arranged to give a particularly large traction tread in contact with the road surface which prevents the sinking of the vehicle and insures also of the effective propulsion of the same.

A further object is to construct the device so that it can be readily applied on an existing type of automobile chassis without requiring extensive alterations in the same and such that existing manufactured parts can be utilized in the assembly.

A further object is to construct the appliance so that the road shock will be effectively absorbed and such that either of the road wheels utilized may pass over an obstruction without imparting its movement to the other wheel.

A further object is to construct the chain connecting the wheels in a simple, durable and inexpensive manner and such that it can be applied on and will operate over the tires of the wheels and such that an effective traction surface is presented to the road when the device is in use.

A further object is to provide a construction wherein radius rods are utilized to connect the rear driving axle housings to the frame and tie rods are utilized to hold the front axle in spaced relation to the rear axle while permitting of the independent swaying movement of the axles in a substantially vertical direction.

A further and more specific object is to provide forwardly and rearwardly extending hinged arms pivotally mounted in respect to the frame and having their forward and rear ends swivelly attached to the front and rear axles and to associate with the arms a spring preventing them collapsing under the load of the vehicle and operating to cause the load to be transmitted through the arms to the axles.

With the above more important objects in view, the invention consists essentially in the arrangement and construction of parts hereinafter more particularly described, reference being had to the accompanying drawings, in which:—

Fig. 1 is a vertical sectional view longitudinally and centrally through my automobile sleigh.

Fig. 2 is a plan view of the parts appearing in Figure 1.

Fig. 3 is an enlarged detailed horizontal sectional view at 3—3' Figure 1.

Fig. 4 is a vertical sectional view at 4—4' Figure 3.

Fig. 5 is a perspective view of one of the inner rings.

Fig. 6 is a perspective view of a portion of the chain.

Fig. 7 is a perspective view of one of the chain plates and showing it in inverted position to expose the saddle.

Fig. 8 is a perspective view of one of the front runners and associated parts.

Fig. 9 is a perspective view of a portion of the pivot connection connecting the rear arm to the housing.

Fig. 10 is a perspective view of the flared head of one of the axle housings.

In the drawings like characters of reference indicate corresponding parts in the several figures.

In carrying out my invention, I utilize the conventional automobile frame 1 which carries forwardly the customary internal combustion engine 2, the engine driving the propeller or drive shaft contained in the shaft housing 3. Usually the housing extends angularly rearwardly and downwardly from the end of the engine transmission case being connected thereto by a universal joint 4.

In my case, however, I retain the universal joint 4 although such is not necessary and utilize a further universal joint indicated at 5 in the propeller shaft, the front portion of the propeller shaft in advance of the joint 5 having the rear end thereof permanently secured in any suitable manner as indicated at 6 to a cross brace 7 carried by the frame and the rear part 3' of the propeller shaft then inclines rearwardly and downwardly to the customary differential gear housing 8 containing the customary differential gears utilized to drive the usual rear axles 9 contained in the rear axle housings 10. Here it will be observed that the rear axles are located considerably to the rear of the main frame.

The axle housings terminate in the customary flaring heads 11 and the heads are connected by the rear radius rods 12 and 13 to the drive shaft housing as best shown in Figure 2. The rear ends of the radius rods are forked (see Figure 4) and are fastened by the bolts 14 and 14' to the heads 11 in the usual manner and the heads are also provided with a rearward bolt 15 utilized for a purpose later disclosed and which bolt has the same location in regard to the head and in a Ford type of automobile as the brake shoe supporting bolt. The outer end of each rear axle supports in the usual way the rear driving wheel 16 supplied on the inner side with the customary brake drum 17.

The bolts 14 and 14' and that 15 are utilized to fasten also to the head an annular inner ring 18 and on the latter ring, I mount slidably in each instance an outer ring 19 which is held from displacement laterally by side clips 20. The forward side of the ring 19 is provided with opposing lugs 21 which receive a vertically disposed pivot bolt 21'.

To the rear end of the main frame, I secure permanently by U-bolts 22 a supporting cross shaft 23, the ends of which project beyond the sides of the frame and are each provided with fixed collars 24. A sleeve 25 is mounted rotatably on each end of the cross shaft and on the sleeve, I mount rotatably the forward end of a rearwardly extending arm 26 which has the rear end thereof terminating immediately to the inner side of the rings in a location above the rear axle housing and adjoining the head thereof. A pivot bolt 27 connects the rear end of the arm to the upstanding side lugs carried by a plate 28 underlying the arm and the plate is provided with a further pair of downwardly extending lugs 29 which receive a pivot bolt 30 connecting them pivotally to a sleeve 31 which sleeve is formed integrally with a further sleeve 32 underlying the same and positioned at right angles thereto and pivotally mounted on a bolt 33 permanently fastened to the head of the housing. In the above manner, the rear end of the arm is pivotally attached to the housing to permit it to rock as occasion may demand under operating conditions.

On the sleeve 25, I mount a further sleeve 34 which is permanently fastened to the inner sleeve 25 such as by a key 35 and the sleeve 34 carries a forward extension 35' permanently bolted as indicated at 36 to a forward arm 37 contained in the plane of the arm 26 and having the forward end thereof connected by a pivot bolt 38 to upstanding lugs carried by a member 39 which is in turn pivotally mounted on a bolt 40 carried by lugs extending upwardly from a sleeve 41 rotatably mounted on a forward cross shaft 42, the sleeve being secured to the outer side of a collar 43 secured to the shaft.

The shaft is cranked as shown and on the outer ends of the shaft I mount rotatably similar wheels 44 positioned directly in advance of and of the same size as wheels 16. Brace bars 45 and 46 are secured to the outer sides of the arms 26 and 37 and these have their adjacent ends rotatably mounted on the outer end of the sleeve 25. A leaf spring 47 is located underneath the joint connecting the arms 26 and 37, the spring engaging the joined ends of the arms and having the outer ends thereof connected by shackles 48 of the usual type. It will be observed that the load on the frame is transmitted through the shaft to the arms at their point of juncture and that the springs prevent collapse at this point so that the load is transmitted to the front and rear wheels 44 and 16. The springs, however, yieldingly support the load as will be readily understood.

Between the sleeve 41 and the collar 43, I locate a further sleeve 49 which is pivotally connected at 50 to the forward end of a tie rod 51, the rear end of the tie rod being rotatably mounted on the bolt 21' hereinbefore mentioned. The tie rod is provided with suitable means for adjusting the length of the same and serves to anchor the flaring head of the rear axle housing to the front shaft. The shaft 42 is cranked so that it will clear the propeller shaft should said cranked shaft rise and in order to hold the cranked shaft in a relatively fixed position I have pivotally connected to it centrally a tube 52 which telescopically receives the rear end of a rod 53, the forward end of which is pivotally connected to the forward end 3 of the propeller shaft. The forward end of the rod and the rear end of the tube are supplied with hooks which carry the ends of a coiled spring 54.

The coiled spring is normally in tension and at such time the rear end of the rod is engaging the closed rear end of the tube. Should the crank shaft strike an obstruction on the road, the spring will extend and will then return the parts to their original positions after the obstructions is passed.

The wheels which are provided with the customary tires 55 are connected by a continuous chain 56 which is formed from a series of similar substantially rectangular plates 57 having eyes 58 at the corners thereof and the plates being connected one to the other by similar links 59 pivotally connected to adjacent eyes as best shown in Figure 6. The eyes are formed at the ends of straps 60 permanently bolted to the ends of the plates. Each plate is provided at its front and rear edges with upstanding flanges 61 which reinforce said edges of the plate and the flanges carry suitably positioned lugs 62 adapted to insure of an effective grip on the ground when the device is in use. At the inner side of each plate, I locate a saddle 63 shaped to receive the tire of the wheel, the saddle being permanently attached to the plate in any suitable manner such as by side brackets 64.

The front end of the chassis is supported by a single leaf spring 65 from a cross beam 66, the ends of the spring being connected to the beam by the customary shackles 67. A runner 68 of the type best shown in Figure 8 underlies each end of the beam and the runner is provided with opposing side lugs 69 which receive a pivot bolt 70 and on the bolt between the lugs, I mount a sleeve 71 which carries a vertically disposed spindle 72, the spindle being rotatably mounted in the overlying end of the beam.

To the upper end of the spindle I attach a crank 73 and the rear ends of the cranks are pivotally connected by a cross rod 74 and to this cross rod, I connect the customary steering gear rod not herein shown but of well known type, the arrangement being such that in the end shifting of the rod 74, the runners are simultaneously turned for steering purposes.

This device is particularly advantageous operating on snow and ice and insures of effective traction due to the endless chains which are in contact with the ground for a considerable area. By providing the jointed set of arms 26 and 37 at opposite sides of the frame in the manner shown, either wheel is free to raise or lower without in any way effecting the position of the other wheel and the springs give the desirable resilient riding qualities and prevent collapse at the joint between the arms. The radius rods function to hold the ends of the rear axle in their proper position but allowing of the raising and lowering of the same and the tie rods hold the front wheels in their proper position in relation to the rear wheels while permitting of the raising and lowering of the front wheels to accommodate road conditions. The whole traction arrangement is particularly flexible and resilient and insures of effective road contact.

What I claim as my invention is:

1. The combination with the rear end of an automobile frame, of a cross shaft permanently secured to the frame, a pair of forwardly and rearwardly extending arms rotatably mounted on the ends of the shaft and vertically swingable, a cross shaft underlying the forward ends of the forwardly extending arms, means rotatably receiving the ends of the latter shaft and swivelly connected to the forward ends of the latter arms, forward road wheels carried by the ends of the latter cross shaft, a rear axle housing underlying the rear ends of the rearwardly extending arms and provided with driven road wheels tracking behind the front wheels, means swivelly connecting the ends of the axle housing to the overlying ends of the rearwardly extending arms, endless chains connecting the front and rear wheels, tie rods connecting the front shaft to the rear axle housing and holding the front axle in spaced relation to said housing, radius rods preventing rearward swing of the ends of the axle housing and springs underlying each pair of arms and having their ends attached to the arms and operating through the arms to resiliently support the load imposed on the frame.

2. The combination with the rear end of an automobile frame, of a stationary cross shaft permanently secured to the rear end of the frame, a rear axle housing to the rear of the frame having the ends thereof provided with driven rear wheels, a forward cross shaft underlying the frame, road wheels mounted on the ends of the cross shaft and directly in advance of the rear wheels, a rearwardly extending pair of arms having their forward ends rotatably mounted on the ends of the stationary cross shaft and their rear ends attached to the axle housing by a doubly pivoted joint, a pair of forwardly extending arms having their rear ends rotatably mounted in respect to the ends of the stationary shaft and their forward ends terminating above the front cross shaft and connected thereto by a doubly pivoted joint, a spring underlying the arms at each side of the frame, said spring having the ends thereof connected to the arms by shackles and operating to yieldingly support the frame load imposed on the arms, endless chains connecting the chain wheels, radius rods preventing rearward swing of the ends of the axle housing, rings rotatably mounted on the ends of the axle housing to the inner sides of the rear wheels, sleeves rotatably mounted on the forward cross shaft to the inner sides of the front wheels and tie rods extending between the rings and the sleeves, the tie rods being pivotally connected to such parts by vertical pivot bolts.

Signed at Winnipeg, this 30 day of December, 1929.

JOSEPH W. ROBERTS.